UNITED STATES PATENT OFFICE

HENRY DREYFUS, OF LONDON, ENGLAND

MANUFACTURE OF ALIPHATIC ANHYDRIDES

No Drawing. Application filed March 8, 1929, Serial No. 345,444, and in Great Britain March 21, 1928.

This invention relates to the manufacture of aliphatic anhydrides of formula $(RCO)_2O$ (where R represents an alkyl group containing at least two carbon atoms).

According to the invention I have found that said aliphatic anhydrides of formula $(RCO)_2O$ can readily be prepared by subjecting the vapour of the corresponding aliphatic acids (i. e. the corresponding aliphatic acids of formula RCOOH) to thermal decomposition in presence of one or more phosphoric acids. Thus for instance, by thermally decomposing propionic acid vapour in presence of a phosphoric acid or acids, propionic anhydride may readily be produced.

The reaction may be expressed by the general equation

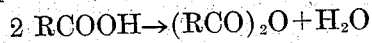
$$2\ RCOOH \rightarrow (RCO)_2O + H_2O$$

in which equation R stands for an alkyl group containing at least two carbon atoms.

In performing the invention I may employ any phosphoric acid, or mixtures of two or more phosphoric acids, for instance, ortho phosphoric acid, pyrophosphoric acid or one or more metaphosphoric acids, or mixtures of any of such acids.

The thermal decomposition of the aliphatic acid vapour may be performed at temperatures of between about 300° and 600° C., and preferably at temperatures of from about 400° to 500° C.

The aliphatic acid vapour may be submitted to the reaction in any suitable way. For instance it may be passed in a stream through a liquid or melted phosphoric acid heated to the desired temperature. Or, for instance it may be passed in a stream over a catalyst mass comprising one or more phosphoric acids and heated to the desired temperature; thus for instance the vapour may advantageously be passed in a stream over a heated catalyst mass comprising one or more phosphoric acids spread upon or deposited upon or mixed with porous materials such as pumice, kieselguhr or the like. In cases where the reaction is performed by passing the vapour over catalyst masses it is convenient to pass the vapour through tubes containing the catalyst mass, either the tubes or the catalyst mass being heated, electrically or otherwise, to the desired temperature.

I preferably perform the reaction in tubes or other apparatus made of or lined with gold, platinum or like inert metals, in order to avoid, as far as possible, attack of the phosphoric acid on the apparatus. In cases where the reaction is performed by passing the vapour over catalyst masses it is especially important to avoid such attack, as it is liable to cause deposition of metallic or other inhibiting impurities on the catalyst mass.

The phosphoric acid or acids or catalyst masses containing the same may, if desired, be regenerated continuously with the reaction; for example, they may be caused to circulate continuously from the reaction through a regeneration zone and be then returned to the reaction zone. The regeneration may be effected by heating the phosphoric acid or acids or catalyst masses to remove water bound or absorbed thereby.

It will be understood that I do not limit myself as to the pressure to be employed in the thermal decomposition, as the process may be performed under ordinary atmospheric pressure, or under reduced pressure or "vacuum", or under pressures higher than atmospheric.

The reaction vapours resulting from the thermal decomposition may be subjected to any suitable treatment for separating the anhydride from the water present or formed in the reaction.

For instance the gases or vapours from the reaction zone may be subjected to fractional condensation, for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction vapours may be passed through one or more solvents for the anhydride which are insoluble or substantially insoluble in water and of higher boiling point than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorobenzene, benzylether, tetrachlorethane, paraffin oil, triacetin, phenetol, anisol, one or more cresols, and paracresyl acetate.

Or, for instance, the reaction vapours may be subjected to a separation treatment whereby the anhydride may be condensed from the reaction vapours whilst carrying away the water vapour by the vapour of one or more entraining liquids. In such form of execution the reaction vapours are preferably mixed after leaving the reaction zone with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether with petroleum ether; it will be understood, however, that any other liquids chemically inert to the anhydride and having a high entraining capacity for water may be employed. The liquids should preferably have a low entraining capacity for the anhydride.

Or, for instance, the reaction vapours may be subjected to a separation treatment by leading them under the surface of an "extracting" liquid cooled down or otherwise kept at temperatures below (and preferably considerably below) the boiling point of water. By such means the anhydride is separated from the water in a highly efficient manner. By the term "extracting" liquid is meant a liquid or liquid mixture which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol, or its homologues. It is preferable to use as "extracting" liquids, liquids of the character referred to which are themselves hydrocarbons or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction vapours may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water, to avoid condensation of water and the resulting risk of loss of anhydride through hydrolysis; and for the best functioning of the treatment the water binding substances should be employed at temperatures above the boiling point of the anhydride, in which case the water can be substantially absorbed and the anhydride pass on in vapour form. The term "water binding" substance means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water, but excluding substances having a deleterious effect on aliphatic acids or anhydrides, such as sulphuric acid.

It will of course be understood that in cases where the thermal decomposition of the acid vapour is performed under pressures higher than atmospheric, the reaction gases or vapours should, prior to treatment for separation or recovery of the anhydride, preferably be passed through suitable apparatus (e. g. one or more reducing valves) wherein the pressure is reduced substantially to normal atmospheric pressure.

The anhydride separated or recovered from the reaction gases or vapours may, if desired or required, be purified by any suitable means. For instance, it may be distilled from anhydrous sodium or other acetate to recover the anhydride in as pure a form as possible.

What I claim and desire to secure by Letters Patent is:—

1. In the process of manufacturing a lower aliphatic anhydride of the formula $(RCO)_2O$ from the decomposition of the corresponding aliphatic acid of the formula RCOOH, where R represents an alkyl group containing at least two carbon atoms, the step which comprises effecting the reaction in the presence of at least one phosphoric acid as catalyst.

2. Process for the manufacture of an aliphatic anhydride of formula $(RCO)_2O$ (where R represents an alkyl group containing at least two carbon atoms), which comprises subjecting the vapour of the corresponding aliphatic acid of formula RCOOH (wherein R represents an alkyl group containing at least two carbon atoms), to thermal decomposition at a temperature between 300° and 600° C. in presence of at least one phosphoric acid.

3. Process for the manufacture of an aliphatic anhydride of formula $(RCO)_2O$ (where R represents an alkyl group containing at least two carbon atoms), which comprises passing the vapour of the corresponding aliphatic acid of formula RCOOH (wherein R represents an alkyl group containing at least two carbon atoms), over a catalyst mass comprising at least one phosphoric acid heated to a temperature between 300° and 600° C.

4. In the process of manufacturing a lower aliphatic anhydride of the formula $(RCO)_2O$ from the decomposition of the corresponding aliphatic acid of the formula RCOOH, where R represents an alkyl group containing at least two carbon atoms, the step which comprises effecting the reaction in the presence of meta phosphoric acid as catalyst.

5. Process for the manufacture of an aliphatic anhydride of formula $(RCO)_2O$ (where R represents an alkyl group containing at least two carbon atoms), which comprises subjecting the vapour of the corresponding aliphatic acid of formula RCOOH (wherein R represents an alkyl group containing at least two carbon atoms), to thermal decomposition at a temperature between 300° and 600° C. in presence of metaphosphoric acid.

6. Process for the manufacture of an aliphatic anhydride of formula $(RCO)_2O$ (where R represents an alkyl group containing at least two carbon atoms), which comprises passing the vapour of the corresponding aliphatic acid of formula RCOOH (wherein R represents an alkyl group containing at least two carbon atoms), over a catalyst mass comprising metaphosphoric acid heated to a temperature between 300° and 600° C.

7. Process for the manufacture of propionic anhydride, which comprises subjecting the vapour of proprionic acid to thermal decomposition in presence of at least one phosphoric acid.

8. Process for the manufacture of propionic anhydride which comprises passing the vapour of propionic acid over a catalyst mass comprising metaphosphoric acid heated to a temperature between 300° and 600° C.

In testimony whereof I have hereunto subscribed my name.

HENRY DREYFUS.